United States Patent [19]

Lwee

[11] Patent Number: 5,320,540
[45] Date of Patent: Jun. 14, 1994

[54] CONNECTOR APPARATUS

[75] Inventor: Nai Hock Lwee, Fremont, Calif.

[73] Assignee: E. I. du Pont de Nemours, Wilmington, Del.

[21] Appl. No.: 961,304

[22] Filed: Oct. 15, 1992

[30] Foreign Application Priority Data

Oct. 18, 1991 [JP] Japan ............................... 3-93119[U]

[51] Int. Cl.5 ............................................ H01R 13/629
[52] U.S. Cl. ........................................ 439/64; 439/68;
439/159; 439/377
[58] Field of Search ................ 439/157, 159, 160, 68,
439/71, 64, 377, 73

[56] References Cited

U.S. PATENT DOCUMENTS 4,810,203 3/1989 Komatsu .............................. 439/326
4,941,841 7/1990 Darden et al. ....................... 439/377
4,984,994 1/1991 Yamamoto ........................... 439/267
5,009,608 4/1991 Shipe ..................................... 439/73
5,033,972 7/1991 Komatsu et al. ................... 439/377
5,052,942 10/1991 Rauterberg et al. ................ 439/326

Primary Examiner—Mark Rosenbaum
Assistant Examiner—David P. Bryant
Attorney, Agent, or Firm—Woodcock Washburn Kurtz Mackiewicz & Norris

[57] ABSTRACT

A connector apparatus has a housing and a container inserted into, and withdrawn from, the housing. The memory card is stored in a storage space of the container. With the container fully inserted into the housing with no memory card placed therein, the insertion inlet of the housing is closed by the front wall of the container, preventing the intrusion of the foreign small particles and dirt into the housing.

8 Claims, 3 Drawing Sheets

CONNECTOR APPARATUS

BACKGROUND OF THE INVENTION

1. Field of the Invention

The present invention relates to a connector apparatus using, as a data storage device, a memory card or hard disc drive package and, in particular, to a connector apparatus having a mechanism for ejecting the data storage device from the housing.

2. Description of the Related Art

Published Disclosed Japanese Patent Applications 63-69375 and 63-77280, for example, disclose a connector apparatus for connecting a memory card to an electronic device, such as the personal, laptop type and notebook type computers.

The connector apparatus has a housing for storing a memory card and an ejector mechanism provided in the housing. The housing has a header on the end of the electronic device side and an insertion inlet for inserting the memory card into the housing. The ejector mechanism has a hand-actuatable lever projecting from the side portion of the housing.

When the memory card is inserted from a socket side via an insertion inlet with the housing of the connector apparatus mounted on the electronic device, the socket of the memory card is fitted to a header of the housing, allowing a electrical connection to be made between the memory card and the electronic device. When the memory card is withdrawn from the insertion inlet side of the housing by actuating the lever of the ejector mechanism, the socket of the memory card is disengaged from the header of the housing, allowing the memory card to be electrically disconnected from the electronic device.

However, since, in the connector device, the insertion inlet of the housing is opened to an outside with the memory card not inserted in the housing, dirt and foreign small particles are liable to be deposited there, suffering an adverse influence therefrom, such as the short-circuiting of the header's connection pins.

SUMMARY OF THE INVENTION

It is accordingly the object of the present invention to provide a connector apparatus which, with a data storage device not in use, can close the insertion inlet of the housing and hence prevent the intrusion of dirt and foreign small particles into the housing.

In one aspect of the present invention, there is provided a connector apparatus for storing at least one of a memory card and hard disc drive package as a data storage device comprising:

a housing including a defining member having a pair of opposed guide frame members to define a space therein and having an insertion inlet provided at one end of a length of the housing, and an electrical connection area provided at the other end of the length of the housing; and a container having an open end in the length of the housing and a closed end in the length of the housing relative to the inlet of the housing upon the insertion of the container into the housing, the container defining a storage space between the open end and the closed end thereof to store a data storage device therein and the size of the storage space being proximately conforming to the size of the space in the housing, wherein the container can be inserted into the housing via the inlet of the housing, while being supportingly guided by the paired guide frame members, and can be withdrawn from the housing;

when the container is fully inserted into the housing, the inlet of the housing is closed by the closed end of the container;

when the container is fully inserted into the housing with the data storage device stored therein, the data storage device is electrically connected to the electrical connection area of the housing; and when the container is withdrawn from the housing with the data storage device stored therein, the data storage device is electrically disconnected from the electrical connection area of the housing.

In another aspect of the present invention there is provided a connector apparatus for electrically connecting at least one of a memory card and hard disc drive package as data storage devices having contact terminals at one end, to an electronic device, the connector apparatus comprising:

a housing including a defining member having a pair of opposed guide frame members to define a space therein and an insertion inlet provided at one end of a length of the housing, and mountable on the electric device;

plurality of contacts positioned in the housing for establishing an electrical connection between the contact terminals of the data storage device and the electronic device; and a container having an open end in the length of the housing and a closed end in the length of the housing closable relative to the insertion inlet of the housing to define a storage space where the data storage device is stored, the size of the storage space nearly conforming to the size of the space defined by the defining member; wherein the container can be inserted into the housing via the inlet of the housing, while being supportingly guided by the guide frame members, and can be withdrawn from the housing;

when the container is fully inserted into the housing, the inlet of the housing is closed by the closed end of the container;

when the container is fully inserted into the housing with the data storage device stored therein, an electrical connection is made between the contact terminals of the data storage device and the contacts of the housing; and when the container is withdrawn from the housing with the data storage device stored therein, the data storage device is electrically disconnected from the contacts of the housing.

Preferably, the container has an opening defined at its upper side to allow the information storage device to be received via the opened upper side and ejecting means which, with the container withdrawn from the housing, can eject the information storage device at the opened upper side of the container.

According to the embodiment of the present invention, the ejecting means is composed of a tongue-like section as a portion of a bottom plate constituting a bottom surface of the container, the tongue-like section being pushed up from a rear surface of the bottom plate.

Preferably, the housing and container have engaging means for allowing them to engage each other in a position where the container is fully inserted into the housing.

It is preferred that a gripping element be provided on the closed wall of the container to allow it to be gripped by hand.

In the connector apparatus of the present invention, with the container fully inserted in the housing, the insertion inlet of the housing is closed by the container's closed end situated on the insertion inlet side of the housing. With the data storage device not in use, the empty container is fully inserted into the housing, thus preventing the intrusion of dirt and foreign small particles into the inside of the housing.

Further, the container can serve also as an ejector mechanism with the container withdrawn from the housing. In this case, the connector apparatus as a whole can be made compact because no lever is projected from the side portion of the housing unlike a conventional ejector mechanism.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
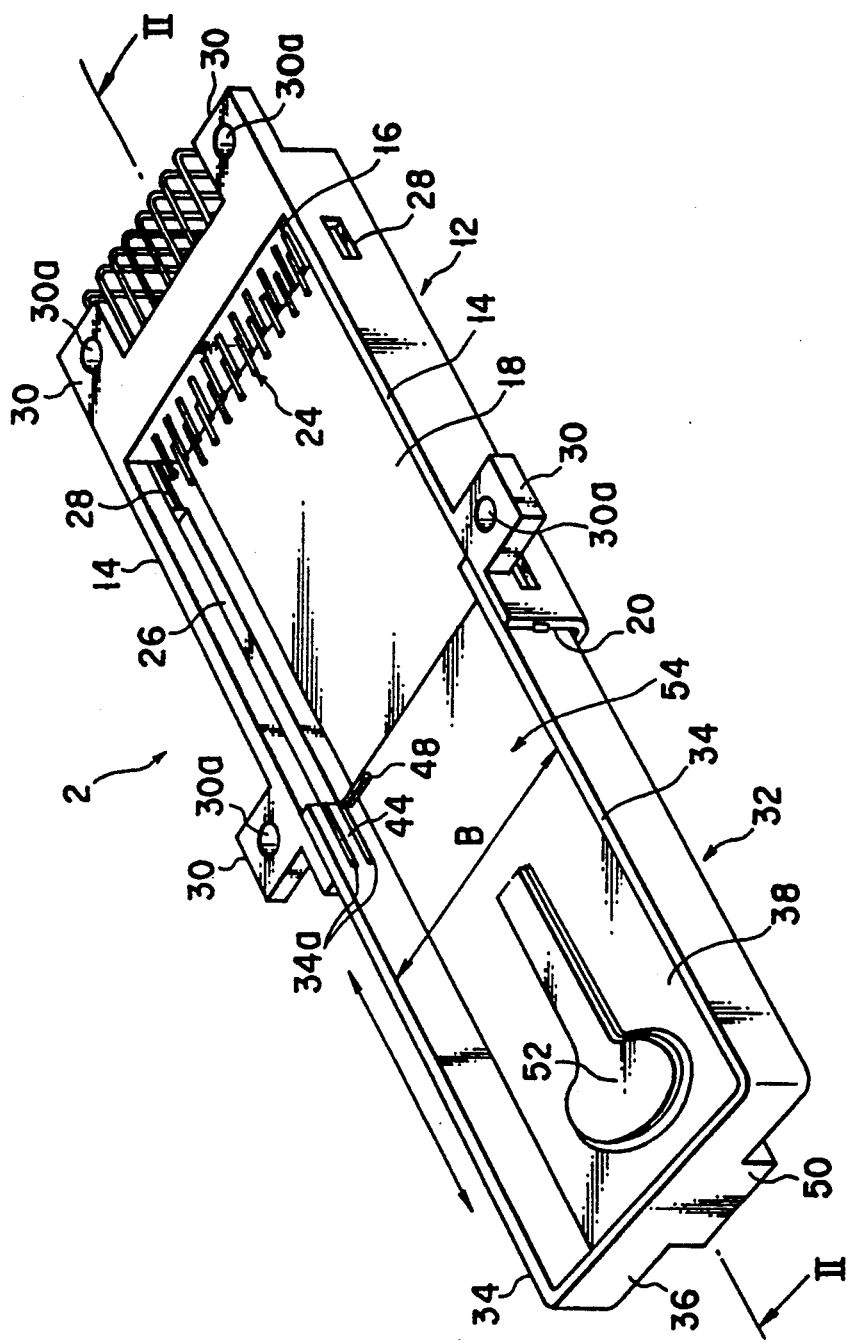
FIG. 1 is a perspective view showing a connector apparatus according to an embodiment of the present invention.
Figure 2:
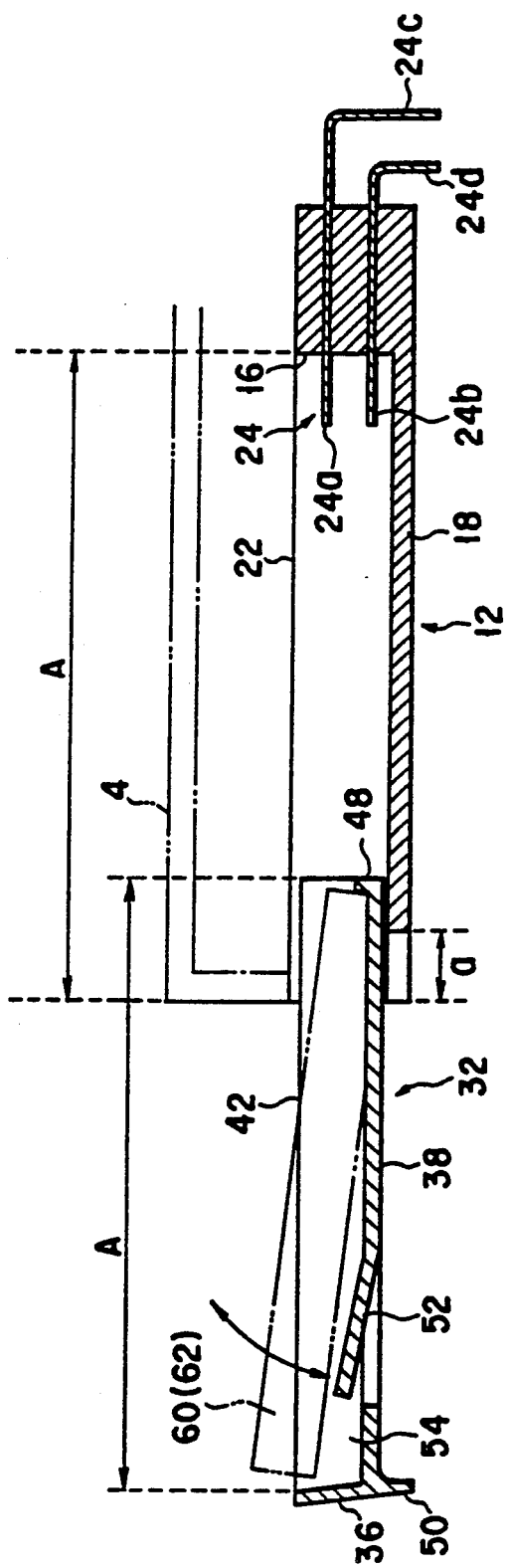
FIG. 2 is a cross-sectional view, taken along line II—II in FIG. 1, showing the connector apparatus of the invention.
Figure 3:
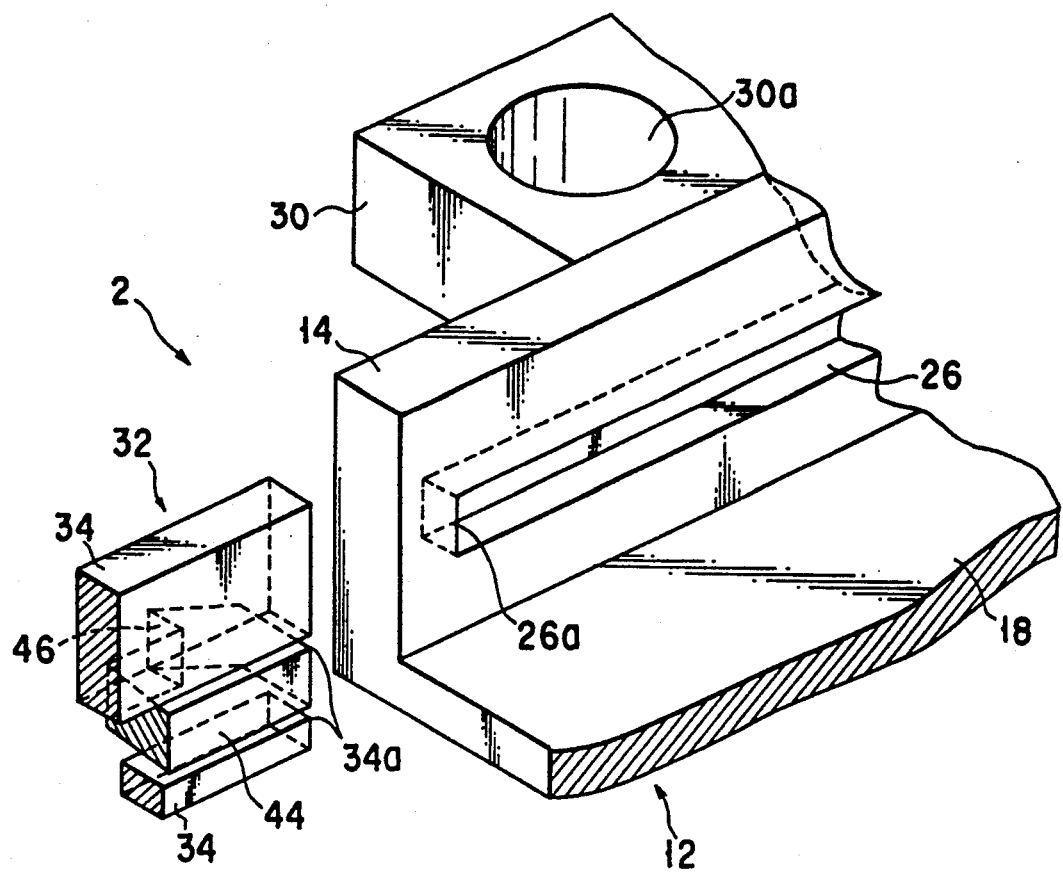
FIG. 3 is an exploded view showing an engaging hook on the connector apparatus of the present invention.

FIGS. 1 to 3 show a connector apparatus according to an embodiment of the present invention. The connector apparatus 2 of the embodiment is mounted on a casing 4 of a known computer apparatus, such as personal, laptop type, notebook type computers, etc.

The connector apparatus 2 includes a housing 12 and container 32.

The housing 12 has a pair of guide frame members 14 as members for defining an inner space, that is, defining both side walls of the inner space. In the present embodiment, the housing 12 further has, as the defining members, a rear wall 16 for defining the rear surface of the inner space and bottom plate 18 for defining a bottom surface. The rear wall 16 and bottom plate 18 are not required as essential sections for the connector apparatus 2 and may be formed, for example, on the casing 4 side. The housing 12 is of a substantially rectangular configuration with a front end surface 20 side and top surface 22 side opened. The front end surface 20 side of the housing 12 provides an insertion inlet. A header, that is, a male connector 24 is located at the other end (the rear wall 16 in the present embodiment) opposite to the insertion inlet.

The header 24 has connection pin arrays 24a and 24b to be connected to a memory card or hard disc drive (HDD) package as will be set out below. Base ends 24c and 24d of the connection pin arrays 24a and 24b, respectively, extend through the rear wall 16 of the housing 12 and are connected to an interface circuit, not shown, for an information memory device of the computer apparatus.

A pair of guide slots 26 for guiding the container 32 are provided in the inside surfaces of the guide frame members along the longitudinal direction of the guide frame members. The guide slots 26 have stop edges 26a near the insertion inlet 20, as shown in FIG. 3, so as to prevent the container 32 from slipping out of the housing.

Engaging windows 2 to be engaged with engaging hooks 46 as will be set out below are opened near the rear end side portion of the guide frame members 14. The engaging window 28 communicates with the guide slot 26.

A pair of mount members 30 are provided at the forward end portion of the housing 12 and a pair of mount members 30 at the rear end portion of the housing 12. The mount member 30 has a mount hole 30a. The housing 12 is mounted on the casing 4 of the computer apparatus by inserting screws, etc., through mount holes 30a.

The container 32 comprises a pair of side walls 34 defining its side surfaces, forward wall 36 defining its forward surface and bottom plate 38 for defining its bottom surface to provide a substantially rectangular configuration with the rear end wall 40 side and top surface 42 side opened. The container 32 is externally so dimensioned that it can be inserted via the housing insertion inlet 20 into the housing 12 with the rear end side of the container 32 as an insertion end side.

A pair of cuts 34a, upper and lower, are provided at each forward end portion of the side walls 34 of the container 32. A portion of the side wall 34 defined between the upper and lower cuts 34a provides the engaging hook 44 which is elastically projected outwardly of the side wall 34 of the container 32 as shown in FIG. 3 in particular. The engaging hook 44 has its projection 46 slidably inserted along the guide slot 26 of the housing 12. By so doing, the container 32 can be inserted into, and withdrawn out of, the housing 12 along the guide frame members 14.

With the container 32 fully inserted into the housing 12, the projection 46 of the engaging hook 44 is elastically projected from the guide slot 26 toward the engaging window 28. As a result, the engaging hook projection 46 engages the engaging window 28, thereby holding the container 32 in a fully-inserted, latched state.

A stopper member 48 is upwardly projected at each rear end of the container bottom plate 38. With the container 32 fully inserted into the housing 12, the stopper member 48 abuts against the inner surface of the rear wall 16 of the housing 12 and the hook projection 46 is latched to the engaging window 28 of the housing 12. As a result, the container 32 is latched to the housing 12 in such a fully inserted state as set out above. The stopper member 48 abuts against the front end face of a data storage device 60 held in the container 32, and also serves to hold the data storage device 60 in position. The stopper member 48 may be provided on the housing 12 instead.

The forward surface side of the forward wall 36 of the container 32 is so dimensioned that it can close the housing insertion hole 20 with the container 32 fully inserted into the housing 12.

The forward wall 36 of the container 32 preferably has a grip so as to facilitate the ease with which the container 32 is inserted into, and withdrawn out of, the housing 12. In the present invention, a plate-like grip 50 extends down from the lower end of the forward wall 36 of the container. The configuration of the grip 50 is not restricted to that shown in the FIG. 2. When the container 32 is to be withdrawn out of the housing 12, the user pulls the grip 50, by hand, toward himself or herself so that the container 32 is withdrawn out of the housing insertion hole 20. When the container 32 is to be pulled away from the housing 12, the projection 46 of the engaging hook is unlatched from the engaging window 28 by a known proper means. With the container 32 further pulled out, the projection 46 of the engaging hook 44 makes contact with the stop edge 26a of the guide slot 26, thus preventing the container 32 from slipping out of the housing 12.

The bottom plate 38 of the container preferably has a tongue-like section 52. The tongue-like section 52 is provided at the portion of the bottom plate 38 of the container 32 by a cutting or striking-out method and can be elastically deformed in an up/down direction.

The connector apparatus 2 is so dimensioned that the length A of the housing 12 defined in a direction of depth of the inner space is made equal to the length of the information memory device 60 defined in the longitudinal direction of the device 60. Further, the forward end portion of the housing bottom plate 38 is cut out by a predetermined distance a to allow the passage of the grip 50.

The inner size of the container 32 is so defined as to insert one information memory device 60 from the upper opening 42. That is, the inner storage space 54 of the container 32 defined by the pair of side walls 34, forward wall 36 and bottom plate 38 is such that the size A defined in the depth direction and size B defined in the width direction of the container 32 are made equal to the size defined in the longitudinal direction and size defined in the width direction of the information memory device, respectively.

Stated in more detail, the inner space size of the housing 12 is as approximate as possible to the storage space 54 of the container 32, thus reducing the outer dimension of the housing 12. It is thus possible to make the size of the connector 2 compact as a whole.

The connector apparatus 2 as set out above can selectively hold, as the information memory device, either one of one memory card and HDD package therein.

Figure 4:
FIG. 4 is a side view showing a memory card to be employed on the connector apparatus of the invention.

One form of the memory card 62 is shown in FIG. 4. The memory card 62 is typically a nonvolatile RAM and can be pulled out of the connector device after it has once loaded information into the computer apparatus. A socket 64, that is, a female connector, is provided on the front end surface of the memory card 62 to allow the pin contact array (24a, 24b) to be fitted therein.

Figure 5:
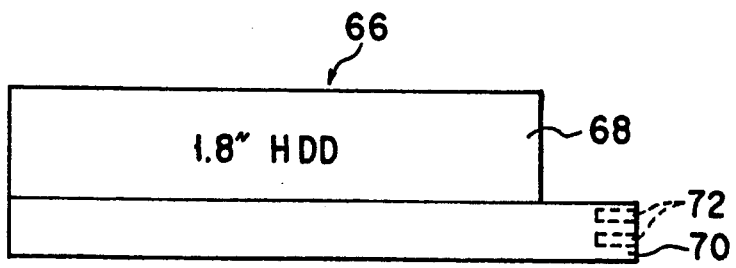
FIG. 5 is a side view showing an HDD package to be used on the connector apparatus of the invention.

One form of an HDD package 66 is shown in FIG. 5. The HDD package 66 is of such a thin type as to have a thin type housing 68 for accommodating a thin type HDD, such as a 1.8 inch disc drive (not shown), and a plate member 70 for accommodating a disc drive operation circuit (not shown). A receptor 72, that is, a female connector, of an I/0 connector is provided on the front end face portion of the plate member 70 to allow the pin contact array (24a, 24b) to be fitted therein. The HDD package 66 can be employed in the same way as the memory card 62.

The operation of the aforementioned connector apparatus 2 will be explained below. Here the housing 12 of the connector apparatus 2 is fitted in the casing 4 of the computer apparatus and the base ends 24c and 24d of the header 24 are electrically connected to the interface circuit for the information memory device of the computer apparatus.

With the container 32 withdrawn from the housing 12, the memory card 62 is held in the container 32 in which case the socket 64 of the memory card 62 is situated on the rear end side of the container 32. When the container 32 with the memory card 62 held therein is inserted into the housing 12, the container 32 is fully latched to the housing 12 by the abutment of the stopper member 48 against the rear wall 16 of the housing 12 and the engagement of the projection 46 of the engaging hook 44 with the engaging window 28. In this state, the pin contact array (24a, 24b) of the header 24 is fitted into the socket 64 of the memory card 62 whereby the memory card 62 is electrically connected to the computer apparatus.

When the memory card 62 is to be withdrawn from the computer apparatus, the container 32 is pulled, by hand, via the insertion inlet 20 of the housing. At that time, the attachment of the memory card 62 to the pin contact array (24a, 24b) is released and the memory card 62, together with the container 32, is withdrawn away from the housing insertion inlet 20. The memory card 62 can be ejected at the opening 42 as indicated by a dot-dash line in FIG. 2 by pushing up the tongue-like section 52 of the bottom plate 38 of the container 38, by hand, from below. The provision of the tongue-like section 52 facilitates the ease with which the memory card 62 is detached from the container 32.

When that empty memory card 62 is again fully inserted into the housing 12, the insertion inlet 20 of the housing 20 is closed by the front wall 36 of the container, preventing the intrusion of fine particles and dirt into the inside of the housing.

In the case where the HDD package 66 is attached to, and detached from, the computer apparatus, the receptor 72 of the plate member 70 of the HDD package 66 is brought into and out of engagement with the pin contact array (24a, 24b) of the header 24.

The present invention is not restricted to the aforementioned embodiment. Various changes and modifications of the present invention can be made without being restricted to the aforementioned embodiment. Although, in the aforementioned embodiment, the connector apparatus 2 has been explained as having the male connector 24 and the information memory device as having female connectors 64 and 72, the connector apparatus 2 may, on the other hand, have female connectors and the information memory device have the male connector.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A connector apparatus for storing a data storage device wherein said data storage device has a connector disposed within a front end thereof, said connector apparatus comprising:
   a housing having a pair of opposing guide frame members defining an inner space of the housing, the space between one end of each of said guide frame members defining an insertion inlet of the housing, said housing having an electrical connector coupled at an end opposite the insertion inlet; and
   a container having a bottom support member, opposing side walls, and a forward end wall that cooperate to define a storage space of said container, the top and rear end of said container being open, said container being insertable into said housing through the insertion inlet thereof and being movable into and out of said housing, the bottom support member of said container being adapted to support a data storage device inserted in said container such that the front end of the storage device is disposed proximate the open rear end of said container,
   wherein when the container is fully inserted into the housing, the insertion inlet of the housing is substantially obstructed by the forward end wall of the container and the data storage device is electrically connected via the open rear end of said container to the electrical connector of said housing.

2. The connector apparatus according to claim 1, wherein the open top of said container defines an opening for receiving a data storage device to be inserted therein and wherein said container has ejecting means for ejecting a data storage device inserted therein when the container is withdrawn from the housing.

3. The connector apparatus according to claim 2, wherein the ejecting means comprises a tongue-shaped member integrally formed with the bottom support member of said container, the tongue-shaped member being manually operable to bend up from the bottom support member of said container and impart an ejecting force to the bottom surface of a storage device inserted in said container.

4. The connector apparatus according to claim 1, wherein the housing and container have engaging means for allowing them to engage each other in a position where the container is fully inserted into the housing.

5. The connector apparatus according to claim 1, wherein a gripping element is provided on the forward end wall of the container to allow said container to be gripped by a human hand.

6. The connector apparatus according to claim 5, wherein said gripping element comprises an extension of the forward end wall of said container which extends therefrom in the plane defined by the forward end wall.

7. The connector apparatus according to claim 6, wherein said housing has a cutout formed at the insertion inlet thereof and positioned to receive the gripping element to avoid interference between the housing and the gripping element when the container is fully inserted in said housing.

8. The connector apparatus according to claim 1, wherein a stopper member is formed at a rear edge of the bottom support member and is adapted to abut the forward end face of a storage device inserted into said container to prevent the storage device from sliding in a lengthwise direction of the bottom support member.

* * * * *